Figure 1:
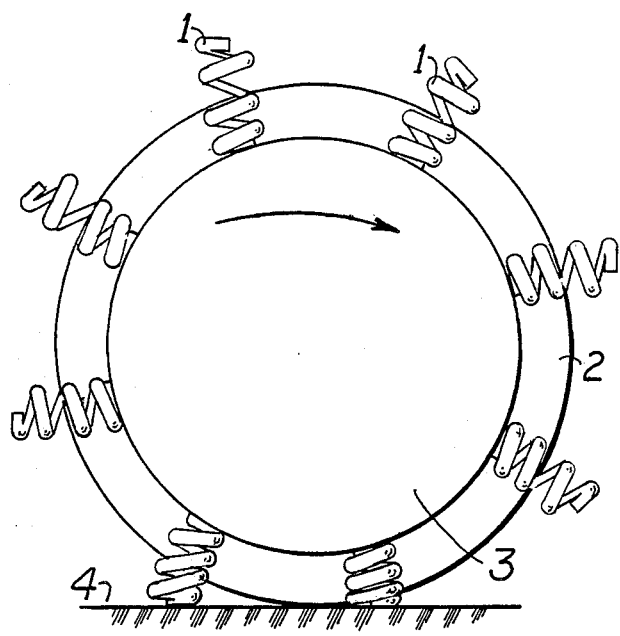

United States Patent [19]

Gardner

[11] Patent Number: 4,878,525
[45] Date of Patent: Nov. 7, 1989

[54] EPICYCLOID ROLLING RESISTANCE ABATEMENT

[76] Inventor: Thomas A. Gardner, 3572 Banbury Dr., #70, Riverside, Calif. 92505

[21] Appl. No.: 299,896

[22] Filed: Jan. 23, 1989

[51] Int. Cl.$^4$ .............................................. B60B 9/00
[52] U.S. Cl. ..................................... 152/14; 267/182
[58] Field of Search .................. 152/5 R, 13, 14, 208, 152/261, 284; 301/405, 41 R; 267/174, 182; 180/165

[56] References Cited

U.S. PATENT DOCUMENTS

| | | | |
|---|---|---|---|
| 1,132,805 | 3/1915 | Solomon | 301/40 S |
| 1,191,175 | 7/1916 | Grosz | 267/286 |

*Primary Examiner*—Robert A. Dawson
*Assistant Examiner*—Gregory J. Wilber

[57] ABSTRACT

In combination with vehicle wheels a means for performing reduction of effective vehicle bearing weight thereby mitigating rolling resistance thereof enhancing energy efficiency. Attachment to be radially fixed on and around a vehicle wheel and configured to extend beyond the periphery of the wheel in a prolapse condition not common to wheel art. The attachment shall be displaceable and capable of energy storage and release sequaciously.

Operation shall be via the nutation of the extended attachment with each nutating cycle bifurcated by the vehicle bearing weight area thereof allowing the bearing weight to be transferred to the displaceable attachments dynamically. The effective bearing weight of the vehicle is reduced and thereof deformations to the vehicle wheel and roadway are mitigated. Reduction of the deformations mitigate nonproductive energy transfer from the vehicle wheel and roadway structure. Wayward to the leeward force displacements are conserved in accordance to the principle of energy conservation. Means of energy efficiency is thus provided.

2 Claims, 1 Drawing Sheet

U.S. Patent   Nov. 7, 1989   4,878,525

EPICYCLOID ROLLING RESISTANCE ABATEMENT

BACKGROUND—FIELD OF INVENTION

This invention relates to rolling vehicle wheels and specifically to a means of rolling resistance abatement.

BACKGROUND—DESCRIPTION OF PRIOR ART

Heretofore, vehicle wheels incur deformations due to the bearing weight transfer of the vehicle. Further, roadways incur a deformation due to the bearing weight transfer of translating vehicles. The deformation due to the bearing weight thereby causes an energy loss to the moving vehicle. Hence, the deformation of the roadway incurs a energy gain of which is detrimental to the structure of the roadway.

This non-productive energy transfer is adverse to environment in the form of atmospheric pollution, noise pollution, and thermal pollution.

OBJECTS AND ADVANTAGES

Accordingly I claim the following as my objects and advantages of the invention: a means mitigating energy loss from the moving vehicle.

In addition I claim as advantage: a means of mitigating the detrimental energy gain to the roadway.

Also as objective, I claim: a means of diminished energy transfer thereby enhancing energy efficiency thereof reducing undesirable pollution.

Further objects and advantages of my invention will become apparent from a consideration of the drawings and ensuing description and operation thereof.

DRAWING FIGURES

Figure 2:
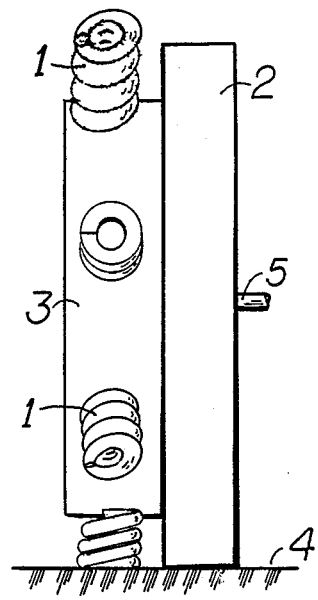
Figure 3:
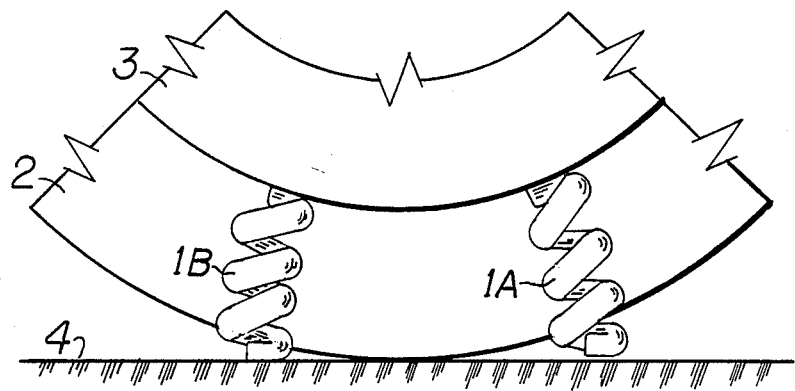

FIG. 1 shows a side view of the wheel with the invention attached.
FIG. 2 shows a front view of FIG. 1.
FIG. 3 shows the invention in the proximity of the weight bearing surface area and part of a wheel.

DRAWING REFERENCE NUMERALS 1 a spring
1a a spring in the relaxed condition
1b a spring in compressed condition
2 a vehicle wheel
3 a symmetrical and concentric cylinder attached to the wheel firmly fixed
4 a roadway surface
5 an axle

DESCRIPTION OF INVENTION

FIG. 1 shows a side view of a rolling wheel 2 with the preferred embodiment of the invention 1 attached. A directional arrow of movement is also shown. The wheel shown 2 is comprised of a fixed rigid cylinder 3 of lesser diameter than the wheel and securely attached symmetrical and concentric to the wheel 2. Attached and surrounding the cylinder are a plurality of helical compression springs 1 that are free to compress and relax. The springs 1 are securely and radially attached with bolts or other means (not shown). The helical springs 1 are incurvate in a manner that the concave side is opposite of the wayward movement of the vehicle as the movement of the wheel 2 approaches the weight bearing area. The incurvate springs 1 at the instant of impact are configured in a manner such the arc distance track via the perimeter of the wheel from the centroid of the bearing area to a centroid point of the protrusion at the junction of wheel perimeter—is greater than— the length track via the centroid of bearing area and the centroid point of initial spring 1 impact. The plurality of springs 1 in the relaxed state are of sufficient length to provide a cusp that protrudes beyond the periphery of the wheel 2. Also shown is a roadway surface 4.

FIG. 2 shows a frontal view of FIG. 1 with an axle 5 enabling rotational coupling to a vehicle.

FIG. 3 partially shows the springs 1 in the operative locale.

OPERATION OF THE INVENTION

Referring to FIG. 3 the spring 1a is shown in its relaxed state at the instant of impact. The spring 1b is shown in its fully compressed state. As the vehicle wheel 2 moves, the relaxed spring 1a incurs compression such that after an interval spring 1a attains condition of spring 1b. The path from impact point to centroid of bearing area is to be less than the arc length via the vehicle wheel 2 to bearing area along the perimeter track due to the longitudinal incurvate eccentric springs 1 as shown. The plurality of springs 1 rotate and translate and said springs 1 nutate sequaciously with each rotation cycle bifurcated by the weight bearing area. The dynamic vertical upward forces thereof in concert reduce the effective vehicle weight. Means of rolling resistance abatement is thereof realized.

While the above description contains many specificities, the reader should not construe these as limitations on the scope of the invention, but merely as exemplifications of preferred embodiments thereof. Those skilled in the art of wheel making will envision many other possible variations are within its scope. For example skilled artisans will readily be able to change the dimensions and shapes of the various embodiments. Wheelwrights will also be able to make the vehicle wheel attachments of alternative materials, such as plastic, steel or other materials. They can make many variations on the adjustment mechanisms such as comprising the springs to absorb, store and release energy at variable rates. For example, they can use other energy storage and release systems to obtain the same objective. Furthermore, compression relaxation can be performed in such a matter that impulse is imparted orthogonal to the vertical axis urging vehicle performance. Accordingly, the reader is requested to determine the scope of the invention by the appended claims and their legal equivalents, and not by the examples which have been given.

I hereby claim:

1. The combination of a vehicle wheel and tire attached thereto and means of rolling resistance abatement comprising:
    a plurality of radially mounted displacement elements on said wheel, the extremities of said elements being elongated beyond the periphery of the tire attached to the wheel, each element of which is within the track of the wheel, said elements surrounding the wheel and incurvate in a manner that a concave side of each element is opposite to the direction of movement of the vehicle, said elements being in a predetermined spaced relation along said wheel, each element contracting as each portion of the tire on the wheel at each predetermined space contacts a surface and each element expanding as each said portion of said tire rolls away from said surface.

2. A method of using the combination of a vehicle wheel and tire attached thereto as described in claim 1 with more than one vehicle wheel and tire combination on a vehicle.

* * * * *